Nov. 2, 1943.  L. H. RIDDELL  2,333,198
GOGGLES
Filed May 6, 1943  2 Sheets-Sheet 1
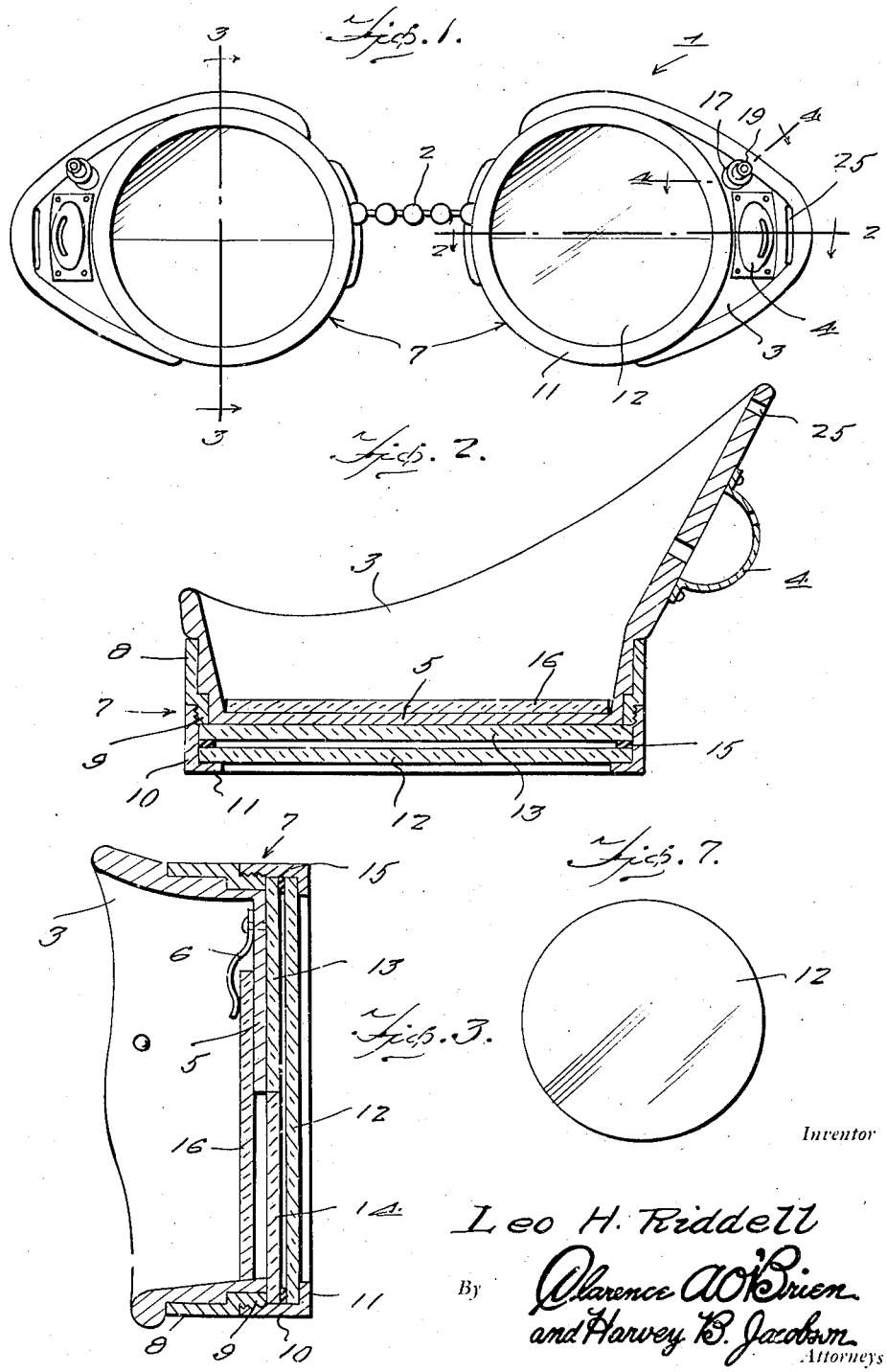
Inventor
Leo H. Riddell
By Clarence A. O'Brien
and Harvey B. Jacobson
Attorneys Nov. 2, 1943.     L. H. RIDDELL     2,333,198
GOGGLES
Filed May 6, 1943     2 Sheets-Sheet 2
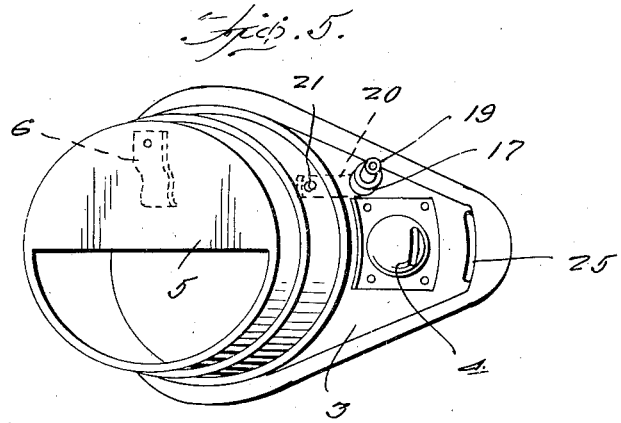
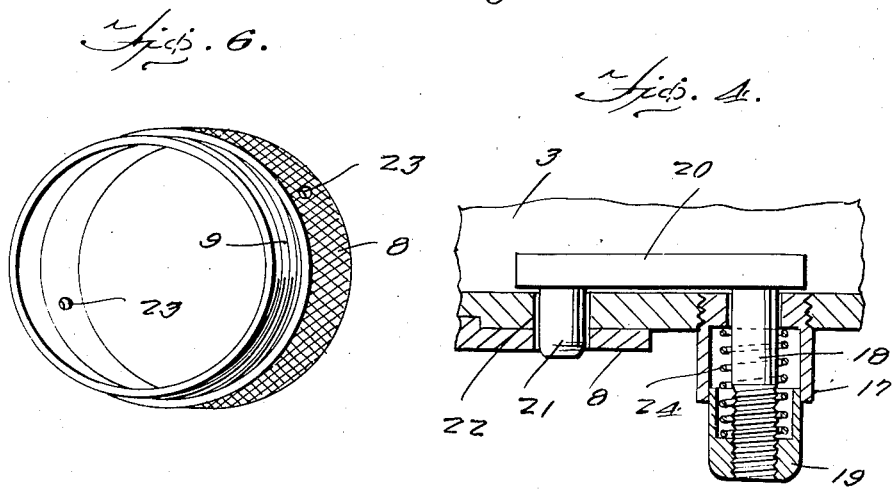
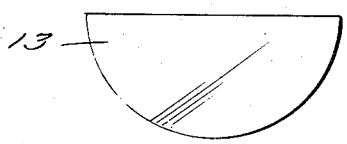
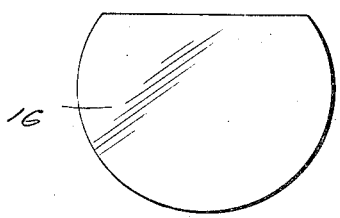
Inventor
Leo H. Riddell
By Clarence A. O'Brien
and Harvey B. Jacobson
Attorneys Patented Nov. 2, 1943

2,333,198

UNITED STATES PATENT OFFICE 2,333,198

GOGGLES

Leo H. Riddell, St. Vincent de Paul, Quebec, Canada, assignor of twenty per cent to Gordon J. Turner, Montreal, Quebec, Canada Application May 6, 1943, Serial No. 485,907

3 Claims. (Cl. 2—14)

The present invention relates to new and useful improvements in goggles, particularly for use by welders, and has for its primary object to provide, in a manner as hereinafter set forth, a novel construction, combination and arrangement whereby all of the various shades and types of lenses which may be needed, including spectacle lenses, if desired, may be conveniently used.

Another very important object of the invention is to provide, in a pair of goggles comprising a multiplicity of lenses for each eye and a rotatably adjustable holder therefor, unique means for releasably securing said holder in adjusted position.

Other objects of the invention are to provide a pair of goggles of the aforementioned character which will be comparatively simple in construction, strong, durable, highly efficient and reliable in use, compact, light in weight, comfortable, attractive in appearance, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in front elevation of a pair of goggles constructed in accordance with the present invention.

Figure 2 is a view in horizontal section, taken substantially on the line 2—2 of Figure 1.

Figure 3 is a vertical sectional view, taken substantially on the line 3—3 of Figure 1.

Figure 4 is a detail view in section through the latch, taken substantially on the line 4—4 of Figure 1.

Figure 5 is a perspective view of one of the goggles.

Figure 6 is a detail view in perspective of one of the rotatably adjustable lens holders.

Figures 7 to 10 inclusive, are detail views in elevation, showing one of each of the different lenses.

Referring now to the drawings in detail, it will be seen that the embodiment of the invention which has been illustrated comprises a pair of goggles which are designated generally by reference numeral 1. The goggles 1 are connected by a flexible chain 2. As the goggles 1 are of identical construction, a detailed description of one will suffice for both.

Each goggle 1 includes an eye cup or hood 3 of suitable material having ventilating means 4 on the outer side portion thereof. Formed integrally with the upper portion of the forward or outer end of the eye cup 3 is a segmental, opaque shield 5. A resilient clip 6 is mounted on the inner side of the shield 5, the purpose of which clip will be presently set forth.

Slipped on the outer portion of the eye cup 3 is a rotatably adjustable, removable lens holder 7. The holder 7 comprises an inner ring 8 which is mounted on the eye cup 3, said ring 8 including a reduced, externally threaded outer end portion 9. Threadedly mounted on the portion 9 of the ring 8 is an outer ring 10. It will be observed that the exposed portion of the ring 8 is knurled to facilitate gripping same. The ring 10 is provided, on its outer end, with an internal flange 11.

Mounted in the holder 7, in abutting engagement with the flange 11, is a protective lens 12. Segmental welding lenses 13 and 14, one of "shade 5" and the other of "shade 4" for example, are mounted in the holder 7 between the protective lens 12 and the shoulder provided by the reduced end portion 9 of the ring 8. A fibre gasket 15 is provided between the lens 12 and the lenses 13 and 14. Mounted within the eye cup 3 is a removable grinding lens 16 which is secured in position behind the shield 5 by the spring clip 6. If desired, a spectacle or magnifying lens may be substituted for the grinding lens 16 or said spectacle or magnifying lens may be engaged beneath the clip 6 with said grinding lens 16.

As illustrated to advantage in Figure 4 of the drawings, a guide 17 is threadedly mounted in an opening provided therefor in the outer side portion of the eye cup 3. A manually operable plunger 18 is slidable in the guide 17. A substantially cup shaped head 19 is threadedly mounted on the outer end portion of the plunger 18 and telescopically engageable in the guide 17. Fixed on the inner end of the plunger 18 at right angles thereto is an arm 20. An outwardly projecting pin 21 on the free end portion of the arm 20 is operable in an opening 22 provided therefor in the eye cup 3. The eye cup 3 has formed therein diametrically opposite openings 23 to be selectively brought into registry with the opening 22 for the reception of the pin 21 for releasably securing the holder 7 in rotatably adjusted position. A coil spring 24 encircles the plunger 18 in the guide 17 and is engaged in the head 19 for projecting the pin 21 into the openings 22 and 23.

It is thought that the manner of using the device will be readily apparent from a consideration of the foregoing. Briefly, if a lens of shade 4 is desired, the plunger 18 is depressed against the tension of the coil spring 24 for freeing the holder 7 from the pin 21. When the holder 7 has been given an initial turn, the plunger 18 is released. Rotation of the holder 7 is continued until the lens 14 is located below the shield 5, as seen in Figure 3 of the drawings, at which time the pin 21 engages in the other opening 23 for releasably locking said holder in adjusted position. If a welding lens of shade 5 is desired, the foregoing operation is repeated to bring the lens 13 into position before the opening below the shield 5 on the eye cup 3. If it is desired to use only the grinding lens 16, the assembled holder 7 with the lenses 12, 13 and 14, therein, is simply slipped off the eye cup 3 after being freed from the pin 21. The lenses 12, 13 and 14 may be expeditiously removed from the holder 7 by unscrewing the ring 10 from the ring 8. Slots 25 in the outer portions of the cups 3 accommodate an elastic head band (not shown).

It is believed that the many advantages of a pair of goggles constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A pair of goggles comprising eye cups having sight openings in their forward ends, said eye cups including shields above the openings, holders mounted for rotary adjustment on the eye cups, lenses in the holders to be selectively brought before the sight openings, and means for releasably securing the lenses in adjusted position.

2. A pair of goggles comprising eye cups having sight openings in their forward ends, said eye cups including shields above the openings, holders mounted for rotary adjustment on the eye cups, lenses in the holders to be selectively brought before the sight openings, and means for releasably securing the lenses in adjusted position, said means including latches comprising guides mounted on the cups, plungers slidable in said guides, arms on the plungers operable in the cups, and pins on the arms, the cups having openings therein for the reception of the pins, the holders having spaced openings therein for selective registry with the first named openings for the reception of the pins.

3. A goggle comprising an eye cup including a substantially segmental shield in its upper outer portion, said eye cup having a sight opening therein below the shield, a lens holder mounted for rotary adjustment on the cup, a plurality of lenses in the holder adapted to be selectively positioned before the opening, a lens removably mounted in the cup against the shield, and means for releasably securing the last named lens in position.

LEO H. RIDDELL.